350-345 SR

2/6/79 OR 4,138,195

United States Patent [19]

Saurer et al.

[11] 4,138,195

[45] Feb. 6, 1979

[54] ELECTRO-OPTIC PASSIVE DISPLAY DEVICE

[75] Inventors: Eric Saurer, Bevaix; Maurice Grimm, Neuchatel, both of Switzerland

[73] Assignee: Ebauches S.A., Canton of Neuchatel, Switzerland

[21] Appl. No.: 794,016

[22] Filed: May 5, 1977

[30] Foreign Application Priority Data

May 13, 1976 [CH] Switzerland ........................ 5998/76

[51] Int. Cl.$^{2}$ ................................................ G02F 1/13

[52] U.S. Cl. ...................................... 350/345; 350/338

[58] Field of Search ........................ 350/345, 336, 338

[56] References Cited

U.S. PATENT DOCUMENTS 3,811,751 5/1974 Myer .................................. 350/345

3,840,695 10/1974 Fischer ............................ 350/345 X 3,869,195 3/1975 Aldrich et al. ....................... 350/345

3,881,809 5/1975 Fergason et al. ................ 350/345 X

*Primary Examiner*—Edward S. Bauer

*Attorney, Agent, or Firm*—Silverman, Cass & Singer, Ltd.

[57] ABSTRACT

An electro-optic display device uses a transparent luminescent panel to reflect and diffuse ambient light, or light from the luminescent panel to a display cell to enable a user to read the display cell. The luminescent panel includes a first transparent electrode arranged between the display cell and a luminescent film. The panel further includes an activation electrode on the opposite side of the film from the first electrode. The activation electrode acts as a reflector - diffuser to reflect and diffuse light received through the other parts of the panel or from the luminescent film itself back to the display cell.

13 Claims, 2 Drawing Figures

ELECTRO-OPTIC PASSIVE DISPLAY DEVICE

The present invention relates to an electro-optic passive display device comprising a display cell provided with a lighting device enabling the reading of the display in the dark.

The known devices of the above mentioned type are cumbersome which is especially disadvantageous in watchmaking. Displays which comprise a lighting device are less contrasted in the daylight than they are when they do not comprise a lighting device, diminishing the quality of the daylight observation of the display. Such lighted displays also present an unequal distribution of the light, which also contribute to making the reading of the display difficult.

The purpose of the present invention is to remove these drawbacks.

SUMMARY OF INVENTION

To this end, the electro-optic passive display device according to the invention is characterized by the fact that the lighting device comprises an electro-luminescent film disposed behind the display cell, the activation electrode of which is arranged in such a way as to constitute the reflector-diffuser of the cell.

DESCRIPTION OF THE DRAWINGS

The drawings show two embodiments of the object of the invention.

DESCRIPTION OF THE INVENTION

Figure 1:
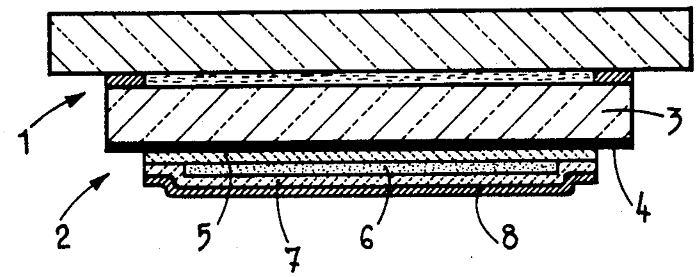
FIGS. 1 and 2 are side elevational view of two electro-optic passive display devices usable in the watchmaking field.

The device represented in FIG. 1 comprises a dichroic display cell 1 which has the advantage of being easy to use, due to the fact that it does not need any polarizer. This display cell 1 is provided, at its rear, with a lighting cell 2.

To this effect, the rear glass-plate 3 of the cell 1 carries, on its outer face, a conductive transparent coating 4, of dioxide of tin ($SnO_2$) on which is deposited an insulating transparent coating 5, for example monoxide of silicon (SiO). This coating 5 carries, deposited thereon, an optically active coating 6 constituting an electro-luminescent film, formed of sulphide of zinc (ZnS) doped by means of manganese (Mn). This coating is also transparent.

The optically active coating 6 is covered with a new insulating transparent coating, designated by 7, which can be realized, as the coating 5, in monoxide of silicon. Lastly, this insulating transparent coating 7 carries, deposited thereon, an opaque conductive metallic coating 8, operating as a reflector-diffuser and as an activation electrode of the lighting device realized, in silver for example.

During the daylight reading of the display, the surrounding light passes through the optically active coating 6 without substantial loss and goes out therefrom after having been reflected by the opaque conductive metallic coating 8.

While reading the display in the dark, one applies an alternating electric field to the conductive coatings 4 and 8, which activates the optically active coating 6. The coating 4 extends beyond the other coatings to allow securing thereto an electric conductor. A portion of the light emitted by this coating 6 is directly sent into the display cell 1, towards the observer, the rest being directed towards the coating 8, constituting a reflector-diffuser, which returns it towards the observer.

This arrangement is not only very compact, due to the fact the lighting device has the shape of a cell directly integrated with the display cell, but its luminous efficiency is also very good since no light guide is necessary.

Figure 2:
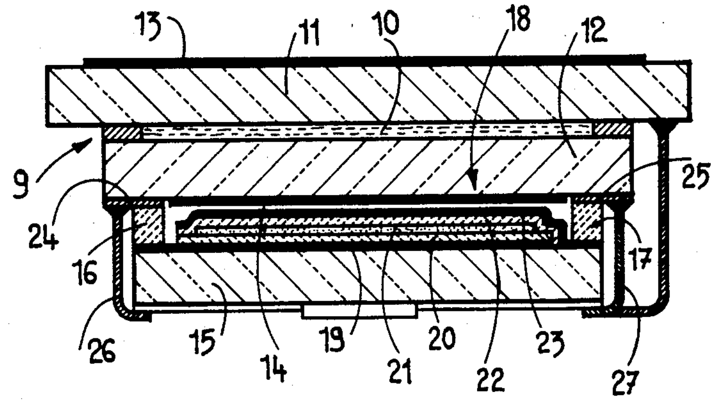

The electro-optic passive display device of FIG. 2 comprises a display cell 9, including a liquid crystal, the active constituant of which is disposed at 10 between two glass plates 11 and 12, and which is provided with two polarizers 13 and 14.

This device comprises a third glass plate, designated by 15, situated behind the cell 9, and which is secured to the rear glass plate 12 of this cell 9, by means of two spacers 16 and 17, made of sintered glass (glassfrit) which maintain the plate 15 at a distance from the plate 12.

The glass plate 15 carries, on its face turned towards the display cell 9, a lighting cell 18 constituted by an opaque conductive metallic coating 19, realized in silver, for example, constituting the activation electrode of the lighting cell and operating moreover as a reflector-diffuser for daylight reading of the display. This coating 19 carries a transparent insulating coating 20, made of monoxide of silicon, for example, on which is deposited an optically active coating 21 constituting the electro-luminescent film, made of sulphide of zinc, doped by means of manganese. Lastly, this coating 21 is covered with a transparent insulating coating 22, for instance made of monoxide of silicon, which is itself covered with a transparent conductive coating 23 realised for example in dioxide of tin.

The device of FIG. 2 operates similarly as the one of FIG. 1.

It is to be noted that the spacer 16 lies on the conductive coating 19 while the spacer 17 lies on the conductive coating 23. It results from this arrangement that, by realising these distance-pieces in cermet, which is an electrically conductive material, one can bring the connections, designated by 24 and 25, to the back of the rear face of the rear glass plate 12 of the cell 9. That brings, by means of connections 26 and 27 respectively, the feeding terminals of the lighting device to the outer face of the glass plate 15. Plate 15 can, moreover, carry for instance the electronic circuits of the watch equipped with the present claimed display device, the whole being thus very compact.

What we claim is:

1. An electro-optic passive display device comprising:
   - a display cell; and
   - a lighting device attached to the display cell on a first side of the display cell opposite the viewing side of the display cell, said lighting device including a transparent electro-luminescent film disposed adjacent said first side of the display cell, said lighting device also including an activation electrode to activate the electro-luminescent film disposed adjacent the electro-luminescent film on a side of the electro-luminescent film opposite the display cell, the activation electrode activating the electro-luminescent film and reflecting and diffusing light transmitted to it through the display cell and emitted from the electro-luminescent film back to said display cell.

2. The device as claimed in claim 1 wherein:

the display cell is dichroic and the lighting device includes a conductive transparent layer coating on said first side of the display cell; first insulating transparent layer coating the conductive transparent layer, the electro-luminescent film coating a part of the first insulating transparent layer, a second insulating transparent layer coating the electro-luminescent film and also coating a part of the first insulating layer at the periphery of the electro-luminescent film, and the activation electrode being a conductive opaque layer coating the second insulating transparent layer, an alternating electric field is applied across the conductive transparent layer and the activation electrode to activate the electro-luminescent film to emit light therefrom.

3. The device as claimed in claim 2 wherein:
the conductive transparent layer is made of tin dioxide.

4. The device as claimed in claim 2 wherein:
the first insulating transparent layer is made of silicon monoxide.

5. The device as claimed in claim 2 wherein:
the electro-luminescent film is made of zinc sulfide doped with manganese.

6. The device as claimed in claim 2 wherein:
the second insulating transparent layer is made of silicon monoxide.

7. The device as claimed in claim 2 wherein:
the activation electrode is made of silver.

8. The device as claimed in claim 1 wherein:
the display cell is a liquid crystal display cell provided with polarizers, and the lighting device includes a glass plate located on said first side of the display cell, the activation electrode being a conductive opaque layer coating a part of the side of the glass plate which is closest to the display cell leaving an exposed end portion, a first insulating transparent layer coating a part of the activation electrode leaving an exposed end portion, the electro-luminescent film coating a part of the first insulating transparent layer leaving a portion of the periphery exposed, a second insulating transparent layer coating the electro-luminescent film and also coating the exposed periphery portion of the first insulating transparent layer, and a conductive transparent layer coating the second insulating transparent layer and said glass plate exposed end portion, an alternating electric field applied across the conductive transparent layer and the activation electrode activates the electro-luminescent film to emit light therefrom.

9. The device as claimed in claim 8 wherein:
the activation electrode is made of silver.

10. The device as claimed in claim 8 wherein:
the first insulating transparent layer is made of silicon monoxide.

11. The device as claimed in claim 8 wherein:
the electro-luminescent film is made of zinc sulfide doped with manganese.

12. The device as claimed in claim 8 wherein:
the second insulating transparent layer is made of silicon monoxide.

13. The device as claimed in claim 8 wherein:
the conductive transparent layer is made of tin dioxide.

* * * * *